United States Patent
Satoh et al.

(10) Patent No.: US 9,824,086 B2
(45) Date of Patent: Nov. 21, 2017

(54) TRANSLATION DEVICE THAT DETERMINES WHETHER TWO CONSECUTIVE LINES IN AN IMAGE SHOULD BE TRANSLATED TOGETHER OR SEPARATELY

(71) Applicant: Sharp Kabushiki Kaisha, Osaka-shi, Osaka (JP)

(72) Inventors: Shinya Satoh, Osaka (JP); Tatsuo Kishimoto, Osaka (JP); Tadao Nagasawa, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/038,742

(22) PCT Filed: Aug. 20, 2014

(86) PCT No.: PCT/JP2014/071786
§ 371 (c)(1),
(2) Date: May 24, 2016

(87) PCT Pub. No.: WO2015/079751
PCT Pub. Date: Jun. 4, 2015

(65) Prior Publication Data
US 2016/0321246 A1 Nov. 3, 2016

(30) Foreign Application Priority Data
Nov. 28, 2013 (JP) ................ 2013-246529

(51) Int. Cl.
*G06F 17/28* (2006.01)
*G06K 9/34* (2006.01)

(52) U.S. Cl.
CPC .......... *G06F 17/289* (2013.01); *G06K 9/348* (2013.01); *G06K 2209/01* (2013.01)

(58) Field of Classification Search
CPC ...................................................... G06F 17/28
(Continued)

(56) References Cited

U.S. PATENT DOCUMENTS 4,894,779 A   1/1990   Suzuki et al.
5,867,811 A * 2/1999   O'Donoghue ...... G06F 17/2827
                                                          704/1

(Continued)

FOREIGN PATENT DOCUMENTS

JP   63-136269 A   6/1988
JP   05-002605 A   1/1993
(Continued)

OTHER PUBLICATIONS

Official Communication issued in International Patent Application No. PCT/JP2014/071786, dated Oct. 14, 2014.

*Primary Examiner* — Jesse Pullias
(74) *Attorney, Agent, or Firm* — Keating & Bennett, LLP

(57) ABSTRACT

A condition determining section (24) determines whether or not two consecutive lines in an image meet a joining condition that is based on a characteristic of a language of a character string, the two consecutive lines being extracted from the character string composed of a plurality of lines. In a case where the joining condition is met, an extracted line joining section (25) and a translation section (26) join and then translate the two consecutive lines.

4 Claims, 7 Drawing Sheets

(58) Field of Classification Search
USPC .......................................................... 704/2–8
See application file for complete search history.

(56) References Cited

U.S. PATENT DOCUMENTS

| | | | | |
|---|---|---|---|---|
| 5,978,754 | A * | 11/1999 | Kumano | ............... G06F 17/289 704/3 |
| 6,085,162 | A * | 7/2000 | Cherny | ............... G06F 17/2735 704/2 |
| 6,182,026 | B1 * | 1/2001 | Tillmann | ............ G06F 17/2809 704/2 |
| 6,195,631 | B1 * | 2/2001 | Alshawi | ............. G06F 17/2827 704/2 |
| 6,236,958 | B1 * | 5/2001 | Lange | ................ G06F 17/2827 704/8 |
| 2009/0048820 | A1 * | 2/2009 | Buccella | ............... G06F 17/289 704/2 |
| 2013/0151953 | A1 | 6/2013 | Konno | |

FOREIGN PATENT DOCUMENTS

| | | |
|---|---|---|
| JP | 06-084019 A | 3/1994 |
| JP | 08-147272 A | 6/1996 |
| JP | 2011-081516 A | 4/2011 |
| JP | 2013-122634 A | 6/2013 |

* cited by examiner

TRANSLATION DEVICE THAT DETERMINES WHETHER TWO CONSECUTIVE LINES IN AN IMAGE SHOULD BE TRANSLATED TOGETHER OR SEPARATELY

TECHNICAL FIELD

The present invention relates to a translation device that translates a character string included in a captured image.

BACKGROUND ART

In order to assist understanding of a foreign language, there has been conventionally developed a technique of displaying a translation result of a foreign language included in an image captured by a camera in a state in which the translation result is superimposed on the image. Such a technique typically uses optical character recognition (hereinafter, referred to as "OCR") for extraction of a character string included in an image. Though extraction of a character string is typically performed on a per-line basis in OCR, translation of the character string should be performed on a per-sentence basis for improving translation accuracy. Under the circumstances, there has been known a technique of determining an end of a sentence of a character string extracted on the per-line basis. For example, Patent Literature 1 discloses a technique of determining an end of a sentence on the basis of a period. According to the technique disclosed in Patent Literature 1, in a case where a character string is composed only of alphanumeric characters or nouns, the character string will be determined to be a single sentence even if it does not have a period.

CITATION LIST

Patent Literatures

[Patent Literature 1]
Japanese Patent Application Publication Tokukai No. 2011-81516 (Publication date: Apr. 21, 2011)
[Patent Literature 2]
Japanese Patent Application Publication Tokukaihei No. 6-84019 (Publication date: Mar. 25, 1994)
[Patent Literature 3]
Japanese Patent Application Publication Tokukaihei No. 8-147272 (Publication date: Jun. 7, 1996)

SUMMARY OF INVENTION

Technical Problem

Unfortunately, such a conventional technique is not satisfactory in determining an end of a sentence of a character string. For example, in a case where a character string has no period, the technique disclosed in Patent Literature 1 cannot accurately determine an end of a sentence of the character string. This problem is particularly conspicuous in a case where a captured image includes a character string for which a period is likely to be omitted. Examples of such an image encompass images of a signboard and a menu each written in a foreign language. Inaccurate determination of an end of a sentence results in an inaccurate translation.

The present invention is attained in view of the above problem. An object of the present invention is to provide a translation device and the like that can accurately translate a character string composed of a plurality of lines.

Solution to Problem

In order to attain the above object, a translation device of an aspect of the present invention is a translation device that translates a character string included in a captured image, the translation device including: a character string extracting section for extracting, on a per-line basis, the character string composed of a plurality of lines; a determining section for determining whether or not two consecutive lines in the captured image meet a joining condition that is based on a characteristic of a language of the character string, the two consecutive lines being included in lines extracted by the character string extracting section; and a translating section, in a case where the determining section determines that the joining condition is met, the translating section joining and then translating the two consecutive lines, and in a case where the determining section determines that the joining condition is not met, the translation section translating the two consecutive lines, separately.

Advantageous Effects of Invention

An aspect of the present invention makes it possible to provide a translation device that can accurately translate a character string composed of a plurality of lines.

DESCRIPTION OF EMBODIMENTS

Figure 1:
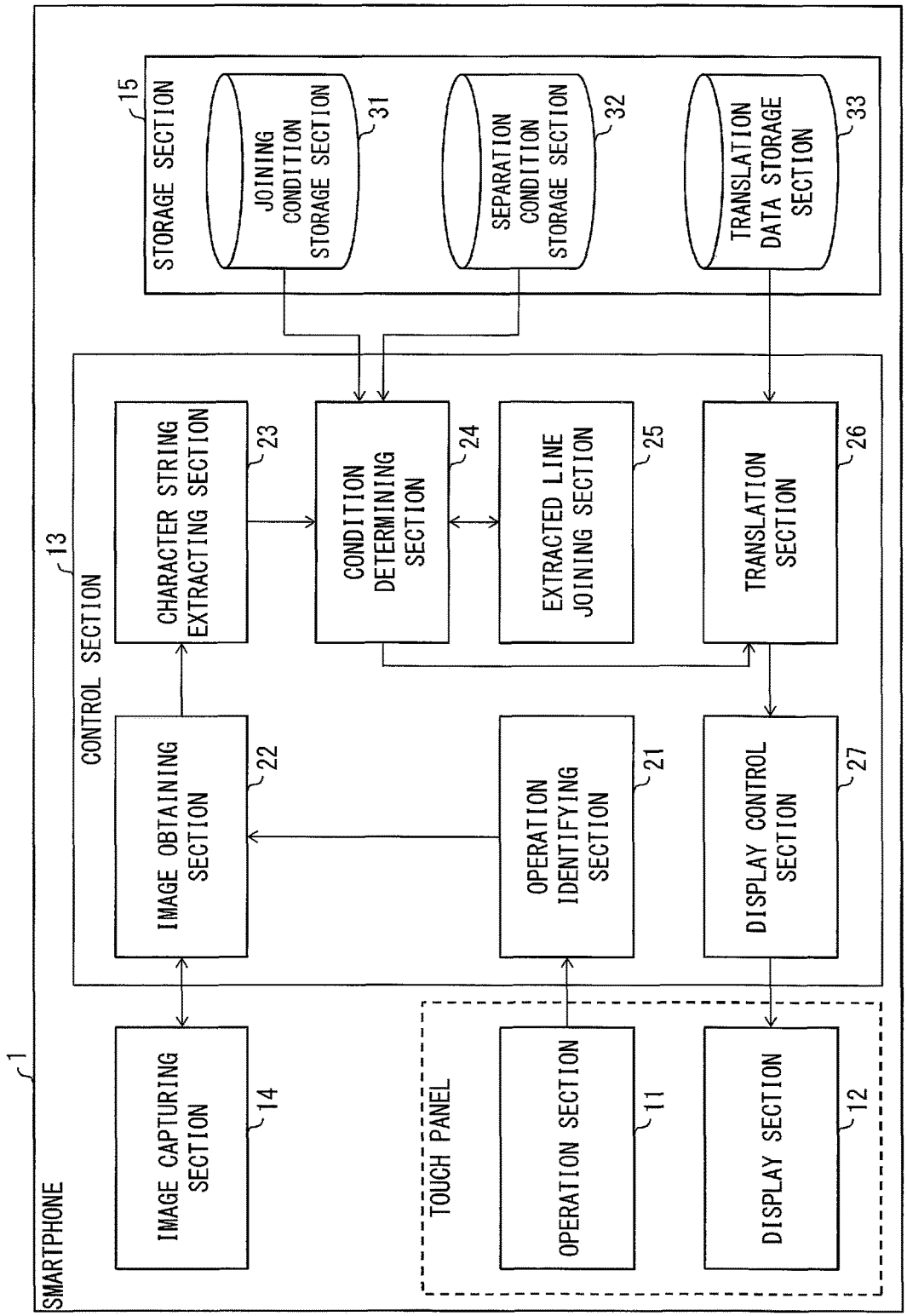
FIG. 1 is a block diagram illustrating a configuration of a main part of a smartphone of Embodiment 1 of the present invention.

The following description will discuss embodiments of the present invention in detail. Note that in the following embodiments, the present invention is applied to a smartphone. Application of the present invention, however, is not limited to a smartphone. The present invention is applicable to any translation device that can translate a character string included in a captured image. For convenience of explanation, an identical reference numeral is given to members having an identical function, in all the embodiments, and a description of the members will be omitted as appropriate. Moreover, shapes of components illustrated in the drawings, and dimensions such as length, size, and width do not reflect actual shapes and dimensions, but are modified as appropriate for clarification of and simplification of the drawings.

Embodiment 1

Figure 2:
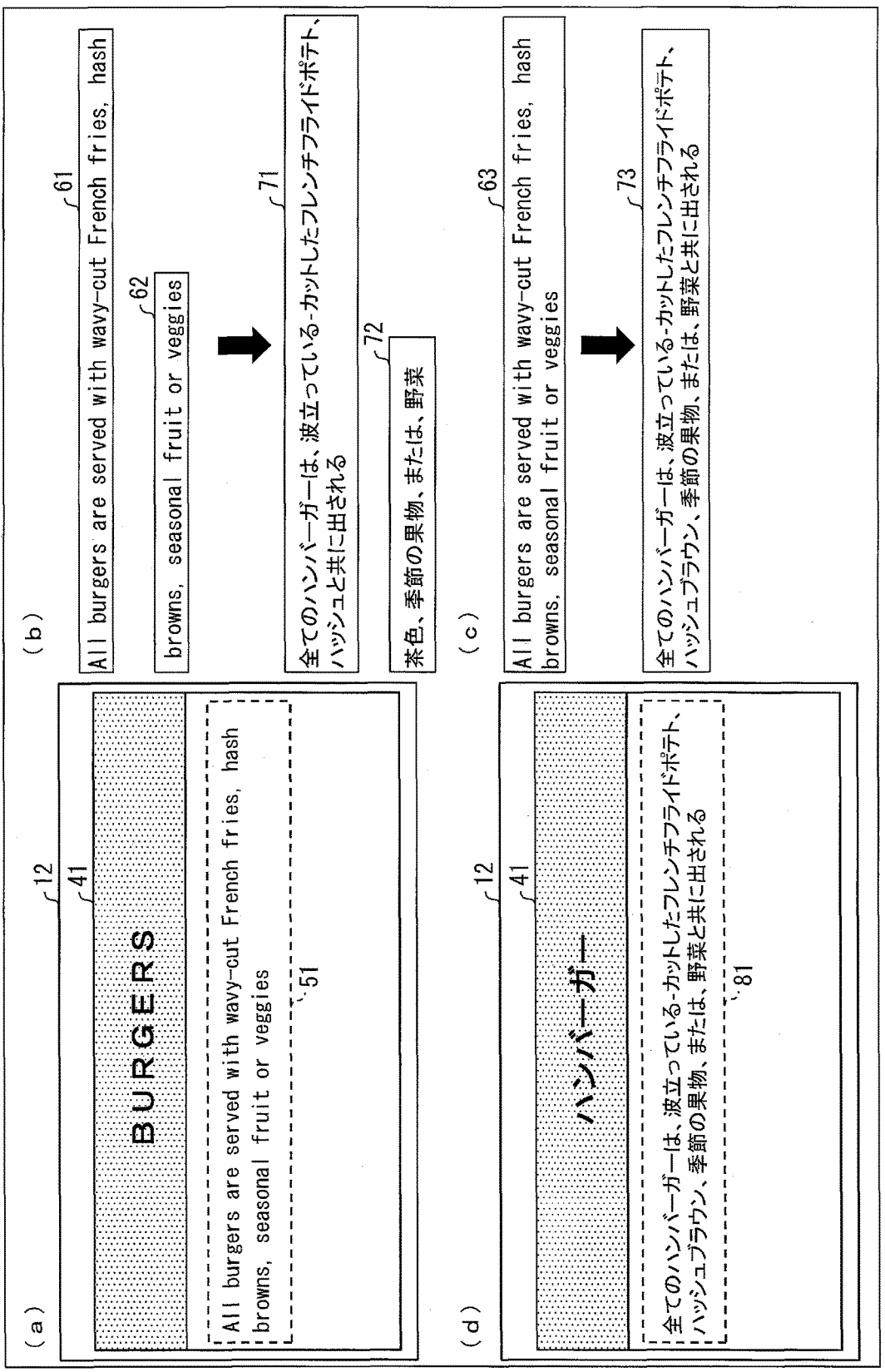
FIG. 2 schematically illustrates an example of a joining condition used in translation of a character string.

The following description will discuss Embodiment 1 of the present invention with reference to FIGS. 1 through 3, and 7. An overview of a smartphone 1 of Embodiment 1 will be first described below with reference to FIGS. 1 and 2. FIG. 1 is a block diagram illustrating a configuration of a main part of the smartphone 1. FIG. 2 schematically illustrates examples of a joining condition used in translation of a character string.

The smartphone 1 of Embodiment 1 translates a character string included in a captured image. As illustrated in FIG. 1, the smartphone 1 includes: a character string extracting section 23 for extracting, on a per-line basis, a character string composed of a plurality of lines; a condition determining section 24 (determining section, character size determining section) for determining whether or not two consecutive lines in the captured image meet the joining condition that is based on a characteristic of a language of the character string, the two consecutive lines being included in lines extracted by the character string extracting section 23; and an extracted line joining section 25 and a translation section 26 (translating section). In a case where the condition determining section 24 determines that the joining condition is met, the extracted line joining section 25 and the translation section 26 join and translate the two consecutive lines. In a case where the condition determining section 24 determines that the joining condition is not met, the extracted line joining section 25 and the translation section 26 translate the two consecutive lines, separately.

The following description will discuss a concrete example of the joining condition with reference to FIG. 2. As illustrated in FIG. 2, the smartphone 1 has an image 41 displayed on a display section 12. This image 41 includes a captured character string 51 written in English. The smartphone 1 of Embodiment 1 extracts the character string 51 on the per-line basis. In a case where extracted lines 61 and 62 that are two consecutive lines included in extracted lines meet the joining condition, which is based on a characteristic of a language of the character string, the smartphone 1 joins the two consecutive lines to each other so as to create an extracted-and-joined line 63, and translates this extracted-and-joined line 63.

This makes it possible to prevent a plurality of lines that should be translated essentially as a single sentence from being translated as different sentences, in a case where the joining condition is based on a characteristic of a language of a character string and indicates that a line break between two consecutive lines is likely to be put in the middle of a sentence. The character string 51 is an English sentence having no mark, such as a punctuation, that separates sentences (see (a) of FIG. 2). Note, however, that even if a plurality of lines has no mark that separates sentences, the smartphone 1 of Embodiment 1 can correctly translate, as a single sentence, a plurality of lines that should be translated as a single sentence.

The following description will discuss the configuration of the main part of the smartphone 1 with reference to FIG. 1. As illustrates in FIG. 1, the smartphone 1 includes an operation section 11, the display section 12, a control section 13, an image capturing section 14, and a storage section 15.

The operation section 11 is an input device that receives an input operation of a user. The operation section 11 of Embodiment 1 constitutes a touch panel together with the display section 12. The operation section 11 includes (i) an input surface that receives a touch event (including the case of proximity) of an indicator such as a finger and a pen, and (ii) a touch sensor that detects (a) the touch event of the indicator on the input surface and (b) a position (coordinates) at which the indicator touches the input surface. The touch sensor can be any sensor that can detect whether or not the indicator touches the input surface. For example, the touch sensor can be a pressure sensor or a capacitance sensor. The operation section 11 outputs detected coordinates to an operation identifying section 21, which will be later described. Note that a form of the operation section 11 is not limited to a touch panel. Alternatively, the operation section 11 can be physical keys or the like.

The display section 12 is a display device that displays, in its display region, an image of information processed by the smartphone 1. Specifically, the display section 12 displays information processed by a display control section 27, which will be later described. An example of the information that is processed by the display control section 27 and displayed by the display section 12 is a translated character string obtained by translation of a character string included in an image captured by the smartphone 1. Note that the display section 12 can be, for example, a display device such as a liquid crystal display (LCD). As described above, the display section 12 of Embodiment 1 is integrated with the operation section 11 and constitutes a touch panel together with the operation section 11.

The control section 13 performs integrated control on sections of the smartphone 1. The control section 13 includes the operation identifying section 21, an image obtaining section 22, the character string extracting section 23, the condition determining section 24, the extracted line joining section 25, the translation section 26, and the display control section 27.

The operation identifying section 21 identifies an input operation received by the operation section 11. Specifically, the operation identifying section 21 identifies the input operation, on the basis of, for example, coordinates of the input operation, a duration of a touch event of the indicator on the input surface, and a direction in which the indicator touching the input surface moves. In accordance with the input operation thus identified, the operation identifying section 21 instructs the above sections of the control section 13 on respective processes to be performed by the sections of the control section 13. For example, the operation identifying section 21 identifies an input operation for causing the image capturing section 14 to operate, and then instructs the image obtaining section 22 to operate the image capturing section 14. Note that the image capturing section 14 will be later described.

The image obtaining section 22 obtains an image by operating the image capturing section 14, which will be later described. Specifically, upon receipt of an instruction from the operation identifying section 21, the image obtaining section 22 causes the image capturing section 14 to capture an image. The image obtaining section 22 then obtains the image captured by the image capturing section 14, and supplies the image thus obtained to the character string extracting section 23. Note that the image obtaining section 22 of Embodiment 1 is configured to obtain an image captured by the image capturing section 14, but is not limited to this configuration. For example, the image obtaining section 22 can also be configured to read out, upon receipt of an instruction from the operation identifying section 21, an image stored in the storage section 15, which will be later described, and supply the image thus read out to the character string extracting section 23. Note also that an image to be obtained can be a still image such as a photograph, a video image such as a moving image, and a so-called through-the-lens image that is displayed on the display section 12, for capturing an image by the image capturing section 14.

The character string extracting section 23 extracts a character string included in an image. Specifically, in a case where an image supplied from the image obtaining section 22 includes a character string, the character string extracting section 23 extracts the character string on the per-line basis. A technique of extracting a character string can be, for example, any existing optical character recognition technique. Note that information that indicates lines extracted (which information will be hereinafter simply referred as "extracted lines") is preferably information that allows identification of a positional relationship of the extracted lines in an image. For example, the character string extracting section 23 can extract lines of a character string included in an image in the order from the top of the character string, and convert the lines thus extracted, into information in a table form in which the extracted lines are arranged in the order of extraction. Note that the extracted lines are not limited to the above example, and can be any information that can allow identification of a positional relationship of extracted lines in an image. The character string extracting section 23 which has extracted all lines constituting the character string supplies the extracted lines to the condition determining section 24.

The condition determining section 24 determines whether or not the extracted lines meet a predetermined condition. Specifically, the condition determining section 24 reads out the joining condition stored in a joining condition storage section 31, which will be later described. The condition determining section 24 then determines whether or not the joining condition is met by two consecutive extracted lines of the extracted lines in an image which extracted lines have been supplied from the character string extracting section 23. In a case where the two consecutive extracted lines is determined to meet the joining condition, the condition determining section 24 supplies the two consecutive extracted lines to the extracted line joining section 25. In such a case, the condition determining section 24 further determines whether or not the joining condition is met by an extracted-and-joined line supplied from the extracted line joining section 25, and a subsequent extracted line, in the image obtaining section 22, following the extracted-and-joined line. In a case where the extracted-and-joined line and the subsequent extracted line are determined to meet the joining condition, the condition determining section 24 supplies both the extracted-and-joined line and the subsequent extracted line to the extracted line joining section 25. Having completed determination for all extracted lines, the condition determining section 24 supplies, to the translation section 26, an extracted-and-joined line(s) and an extracted line(s) which have been subjected to the determination.

The joining condition is based on a characteristic of a language of a character string, and specifically is a condition that indicates that a line break between two consecutive lines is likely to be put in the middle of a sentence. In a case where the character string is written in English, the following conditions (1) to (3) are examples of the joining condition: (1) Between two consecutive lines in an image obtained by the image obtaining section 22, a latter line has a lower-case character as an initial character. (2) Between the two consecutive lines, a former line has a last word whose word class is a conjunction, a preposition, or an article. (3) Between the two consecutive lines, the latter line is composed only of upper-case characters.

The condition determining section 24 of Embodiment 1 reads out the joining conditions (1) through (3), each stored in the joining condition storage section 31 which will be later described, and determines whether or not the two consecutive lines meet at least any one of the joining conditions (1) through (3). For this purpose, the condition determining section 24 of Embodiment 1 has (i) a function of determining whether characters constituting each extracted line are upper-case characters or lower-case characters, and (ii) a function of identifying a word class of a last word of each extracted line. Note, however, that the joining condition is not limited to the above conditions, and can be any condition which is based on a characteristic of a language of a character string included in an image obtained by the image obtaining section 22 and that indicates that a line break between two consecutive lines is likely to be put in the middle of a sentence. Note also that the functions of the condition determining section 24 are not limited to the above functions, and can be any functions corresponding to the joining condition.

The extracted line joining section 25 joins two consecutive extracted lines that meet the joining condition. Specifically, the extracted line joining section 25 joins the two consecutive extracted lines that are supplied from the condition determining section 24, and thereby generates an extracted-and-joined line. The extracted line joining section 25 then supplies, as an extracted line to be subject to determination, the extracted-and-joined line thus generated to the condition determining section 24.

The translation section 26 translates an extracted line(s) and an extracted-and-joined line(s). Specifically, the translation section 26 translates the extracted line(s) and the extracted-and-joined line(s) each supplied from the condition determining section 24, on the basis of translation data read out from a translation data storage section 33, which will be later described. Note that the translation data will be later described in detail. The translation section 26 can use any existing translation technique to perform a translation process (e.g., English-to-Japanese translation process). The translation section 26 supplies a translated character string, which is a translation result of the extracted line(s) and the extracted-and-joined line(s), to the display control section 27.

The display control section 27 determines an image to be displayed on the display section 12. Specifically, on receipt of a translated character string from the translation section 26, the display control section 27 causes the display section 12 to display the translated character string as an image. For example, the display control section 27 can identify a region in which an original character string is displayed on the display section 12, and cause the display section 12 to display the translated character string in the region thus identified. In such a case, the translated character string will be superimposed on the original character string. This allows a user to obtain an image in which a character string is translated in an unspoiled layout of the image captured by the image capturing section 14. Note that the form of a display of the translated character string is not limited to the above example. The translated character string can also be displayed, for example, in the vicinity of the original character string. Alternatively, only the translated character string can be displayed without a display of the captured image.

The image capturing section 14 is an image capturing device (i.e., a camera) for capturing an image of an object. The image capturing section 14 can be any existing camera that is typically mounted on the smartphone 1. Note that the image capturing section 14 can be one that captures a still image such as a photograph, one that captures a video image such as a moving image, or one that can capture both a still image and a video image. The image capturing section 14 is controlled by the image obtaining section 22 to capture an image of an object. The image capturing section 14 transmits a captured still image and/or a captured video image to the image obtaining section 22.

The storage section 15 is a storage device that stores various data to be used in the smartphone 1. As illustrated in FIG. 1, the storage section 15 includes the joining condition storage section 31 and the translation data storage section 33. Further, the storage section 15 can also include a separation condition storage section 32 (see FIG. 1). The separation condition storage section 32 is included in Embodiment 2, which will be later described.

The joining condition storage section 31 stores the joining condition that the condition determining section 24 uses for determining whether or not to join extracted lines. The joining condition storage section 31 of Embodiment 1 includes at least the joining conditions (1) through (3). The translation data storage section 33 stores various data that the translation section 26 uses for translating the extracted line(s) and the extracted-and-joined line(s). Specifically, the translation data storage section 33 stores, for example, dictionary data (e.g., English-Japanese dictionary data) used for translating words, collocations, and idioms included in a character string, and grammatical rules of both an original language to be translated and a language into which the original language is to be translated.

Figure 3:
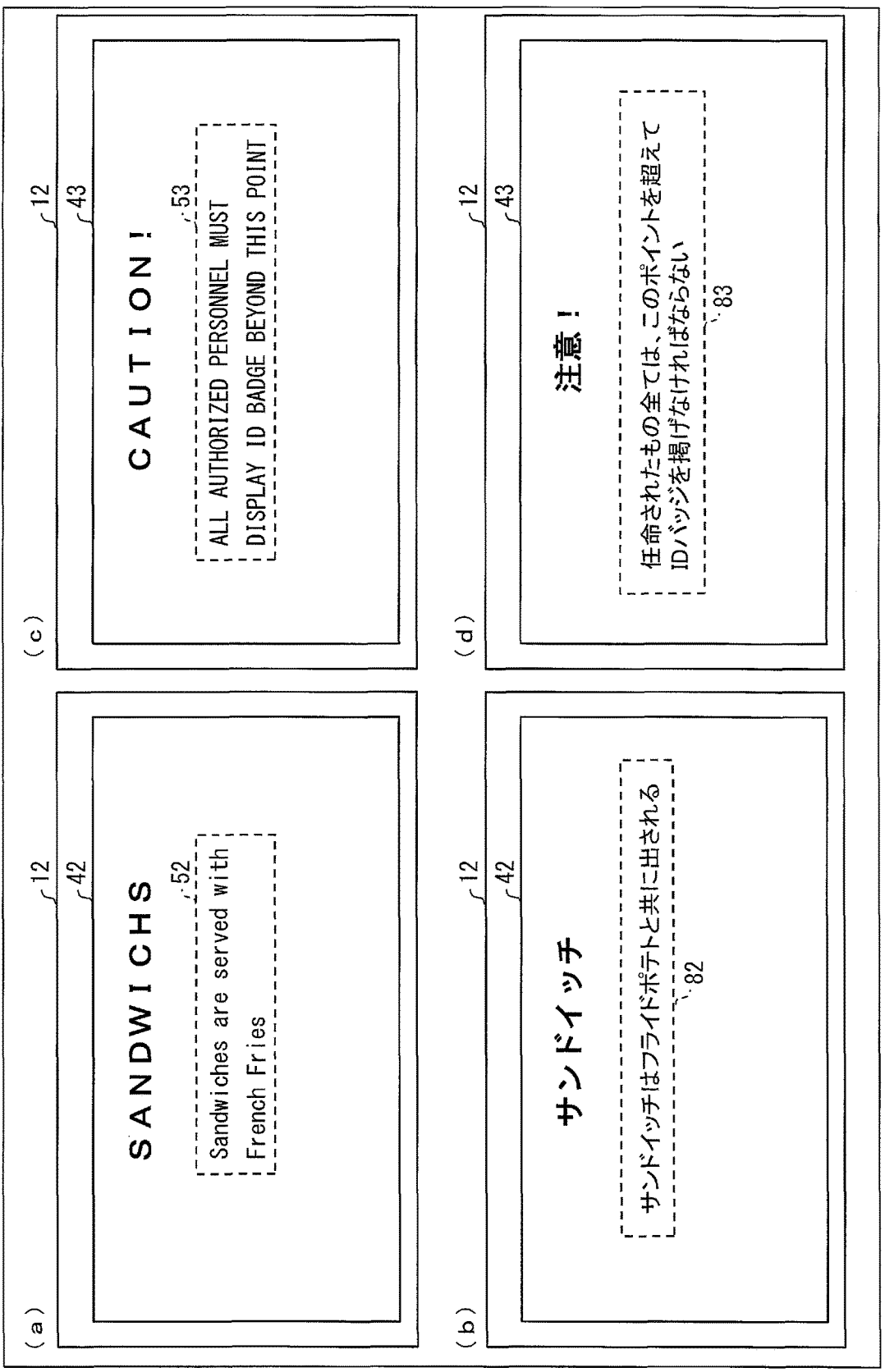
FIG. 3 schematically illustrates other examples of the joining condition used in translation of a character string.

The following description will discuss, with reference to FIGS. 2 and 3, a concrete example of a character string that meets the joining condition. FIG. 3 schematically illustrates other examples of the joining condition used in translation of a character string. As illustrated in (a) of FIG. 2, the image 41 displayed on the display section 12 includes the character string 51, which is a single sentence composed of two lines. The character string extracting section 23 extracts the character string 51 as the extracted lines 61 and 62 (see (b) of FIG. 2). If the extracted lines 61 and 62 are directly translated, the single sentence is split in the middle of the single sentence in translation. This leads to generation of translation results 71 and 72, which are incorrect and is not a translation that a user desires to obtain.

For this reason, the condition determining section 24 of Embodiment 1 determines whether or not the extracted lines 61 and 62 meet the joining conditions (1) through (3). In the example illustrated in FIG. 2, the extracted line 62, which is a latter one of the extracted lines 61 and 62 (two consecutive lines) has a lower-case character as an initial character. The extracted lines 61 and 62 therefore meet the joining condition (1). The extracted line joining section 25 then joins the extracted lines 61 and 62 to generate an extracted-and-joined line 63. The translation section 26 translates the extracted-and-joined line 63 (see (c) of FIG. 2). This leads to generation of a translation result 73, which is a correct translation result that the user desires to obtain. The display section 12 then displays the translation result 73 as a translated character string 81 (see (d) of FIG. 2), thereby presenting the correct translation result of the character string 51 to the user.

As illustrated in (a) of FIG. 3, an image 42 includes a character string 52 composed of two lines. A former line of the character string 52 has, as a last word, the word "with", which is a preposition. The character string 52 therefore meets the joining condition (2). The former line and a latter line of the character string 52 are then joined together so that an extracted-and-joined line is created, and this extracted-and-joined line is translated. Consequently, the display section 12 displays a translated character string 82 that is a correct translation of the character string 52 (see (b) of FIG. 3).

As illustrated in (c) of FIG. 3, an image 43 includes a character string 53 composed of two lines. A latter line of the character string 53 is composed only of upper-case characters. The character string 53 therefore meets the joining condition (3). A former line and the latter line of the character string 53 are then joined together so that an extracted-and-joined line is created, and this extracted-and-joined line is translated. Consequently, the display section 12 displays a translated character string 83 which is a correct translation of the character string 53 (see (d) of FIG. 3).

Figure 7:
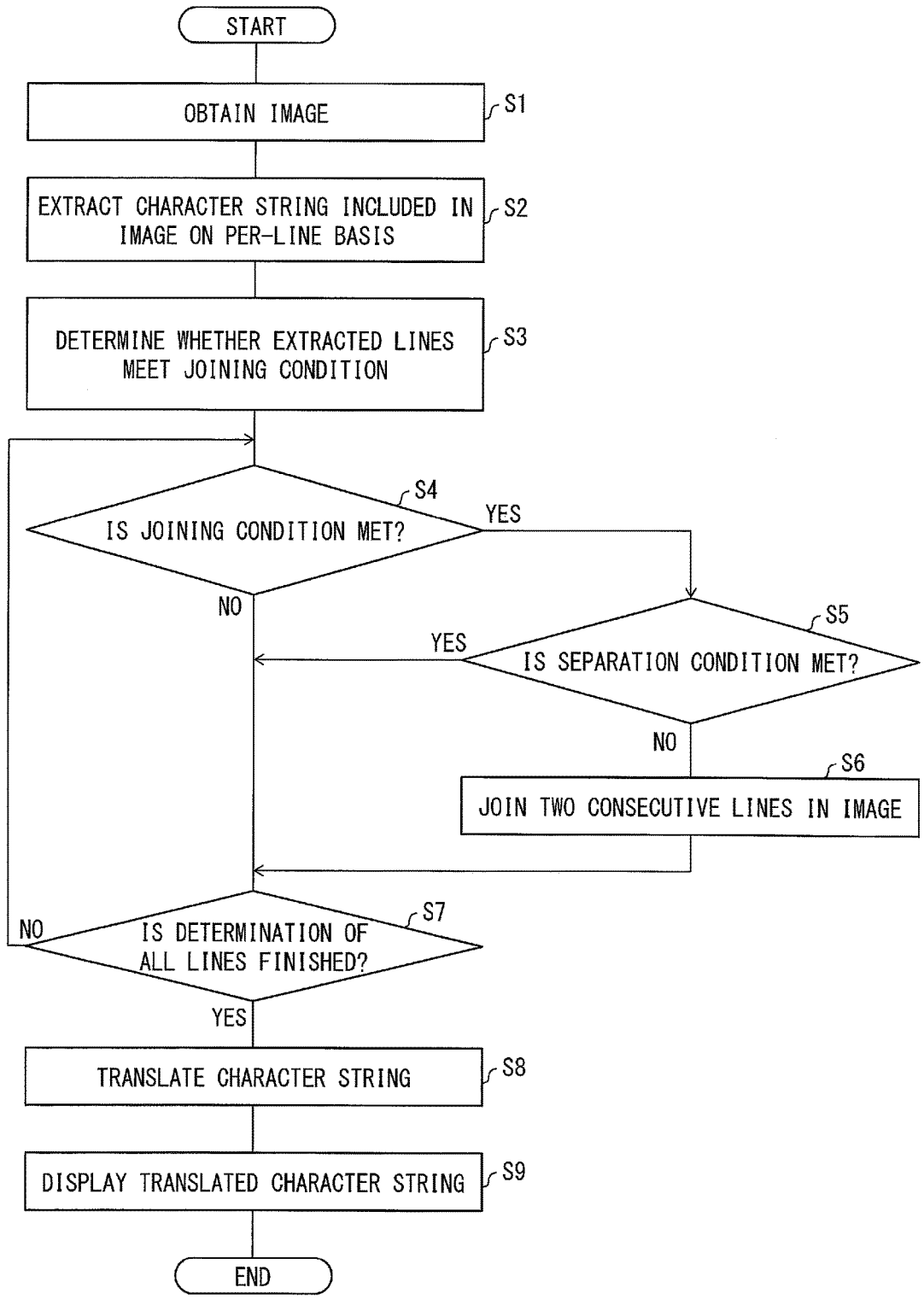
FIG. 7 is a flowchart showing a flow of a process performed by the smartphone illustrated in FIG. 1.

The following description will discuss, with reference to FIG. 7, a flow of a process performed by the smartphone 1. FIG. 7 is a flowchart illustrating an example of the flow of the process performed by the smartphone 1. Note that Embodiment 1 is configured such that the condition determining section 24 determines only whether or not the joining condition is met, and thus omits a description of the step S5.

First, the image obtaining section 22 obtains an image (S1). Here, the image obtaining section 22 obtains an image by, for example, causing the image capturing section 14 to capture an image of the surroundings of the smartphone 1. The image obtaining section 22 supplies the image thus obtained to the character string extracting section 23. Assume that this image includes a character string composed of a plurality of lines. The character string extracting section 23 then extracts, on the per-line basis, a character string included in the image (S2). The character string extracting section 23 supplies information that indicates lines thus extracted (extracted lines) to the condition determining section 24. The condition determining section 24 then determines whether or not the extracted lines meet the joining condition (S3). Specifically, the condition determining section 24 determines whether or not two consecutive lines in the image obtained by the image obtaining section 22 meet the joining condition. In a case where the joining condition is met (YES in S4), the extracted line joining section 25 joins the two consecutive lines in the image (S6). Specifically, the extracted line joining section 25 joins the two lines that are supplied from the condition determining section 24 and that meet the joining condition, thereby generating an extracted-and-joined line. The extracted line joining section 25 then supplies, as an extracted line to be subject to determination, the extracted-and-joined line to the condition determining section 24. In contrast, in a case where the joining condition is not met (NO in S4), the condition determining section 24 does not supply the two lines to the extracted line joining section 25, skipping the step S6.

In a case where the condition determining section 24 has not completed the determination for all the extracted lines (NO in S7), the condition determining section 24 returns to the step S4 and performs the process from the steps S4 through S6 for other two consecutive lines that have not yet been subjected to the determination. In a case where the condition determining section 24 has completed the determination for all the extracted lines (YES in S7), the condition determining section 24 supplies the above extracted-and-joined line(s) and extracted line(s) to the translation section 26. The translation section 26 then translates the character string (S8). Specifically, the translation section 26 translates the extracted line(s) and the extracted-and-joined line(s) each supplied from the condition determining section 24, on the basis of translation data read out from the translation data storage section 33. The translation section 26 then supplies a translated character string that is a translation result of the extracted line(s) and the extracted-and-joined line(s), to the display control section 27. Lastly, the display control section 27 causes the translated character string to be displayed (S9). Specifically, upon receipt of the translated character string from the translation section 26, the display control section 27 causes the display section 12 to display the translated character string in the form of an image.

Embodiment 2

The following description will discuss Embodiment 2 of the present invention with reference to FIGS. 1, 4, 5, and 7. Embodiment 1 is configured such that the condition determining section 24 determines only whether or not the joining condition is met. In contrast, Embodiment 2 is configured such that a condition determining section 24 further determines whether or not two consecutive lines meet, in addition to the joining condition, a separation condition, which is stored in a separation condition storage section 32. The separation condition storage section 32 stores the separation condition that the condition determining section 24 uses for determining whether or not to join extracted lines. The separation condition storage section 32 of Embodiment 2 stores at least separation conditions (4) through (7), which will be later described.

The separation condition indicates an exception of the two consecutive lines that meet the joining condition. That is, the separation condition is a condition for leaving, as unjoined lines, the two consecutive lines that meet the joining condition but are likely to have different sentences, respectively. The condition determining section 24 supplies, to an extracted line joining section 25, the two consecutive extracted lines that have been determined to meet the joining condition but not to meet the separation condition. The extracted line joining section 25 then joins the two consecutive extracted lines that meet the joining condition but do not meet the separation condition.

Specifically, the separation condition is based on at least one of (i) characteristics of characters constituting the two consecutive lines and (ii) a positional relationship between the two consecutive lines. The separation condition indicates that the two consecutive lines are likely to have different sentences, respectively. The following conditions (4) to (7) are examples of the separation condition: (4) In an image obtained by the image obtaining section 22, a difference in character size between two consecutive lines exceeds a predetermined threshold (character size threshold). (5) A distance between the two consecutive lines exceeds a predetermined threshold (distance threshold). (6) The two consecutive lines differ from each other in color of characters. (7) Positions of respective initial characters of the two consecutive lines are different from each other in a line direction of a character string, by more than a predetermined threshold (character position threshold).

The condition determining section 24 of Embodiment 2 reads out the separation conditions (4) through (7) from the separation condition storage section 32, which will be later described, and determines whether or not the two consecutive lines meet at least any one of the separation conditions (4) through (7). For this purpose, the condition determining section 24 of Embodiment 2 further includes: (i) a function of identifying sizes of characters constituting the two consecutive lines to determine whether or not a difference in character size between the two consecutive lines exceeds the character size threshold; (ii) a function of identifying a distance between the two consecutive lines to determine whether or not the distance exceeds the distance threshold; (iii) a function of identifying colors of characters constituting the two consecutive lines to determine whether or not the two consecutive lines differ from each other in color of characters; and (iv) a function of identifying positions of respective initial characters of the two consecutive lines to determine whether or not the positions of the respective initial characters are different from each other in a line direction of a character string, by more than the character position threshold. Note that the separation condition is not limited to the above conditions, and can be any condition that is based on (i) characteristics of characters constituting two consecutive lines of a character string included in an image obtained by the image obtaining section 22 or (ii) a positional relationship between the two consecutive lines, and that indicates that the two consecutive lines are likely to have different sentences, respectively. Note also that the functions of the condition determining section 24 are not limited to the above functions, and can be any functions corresponding to the separation condition.

Figure 4:
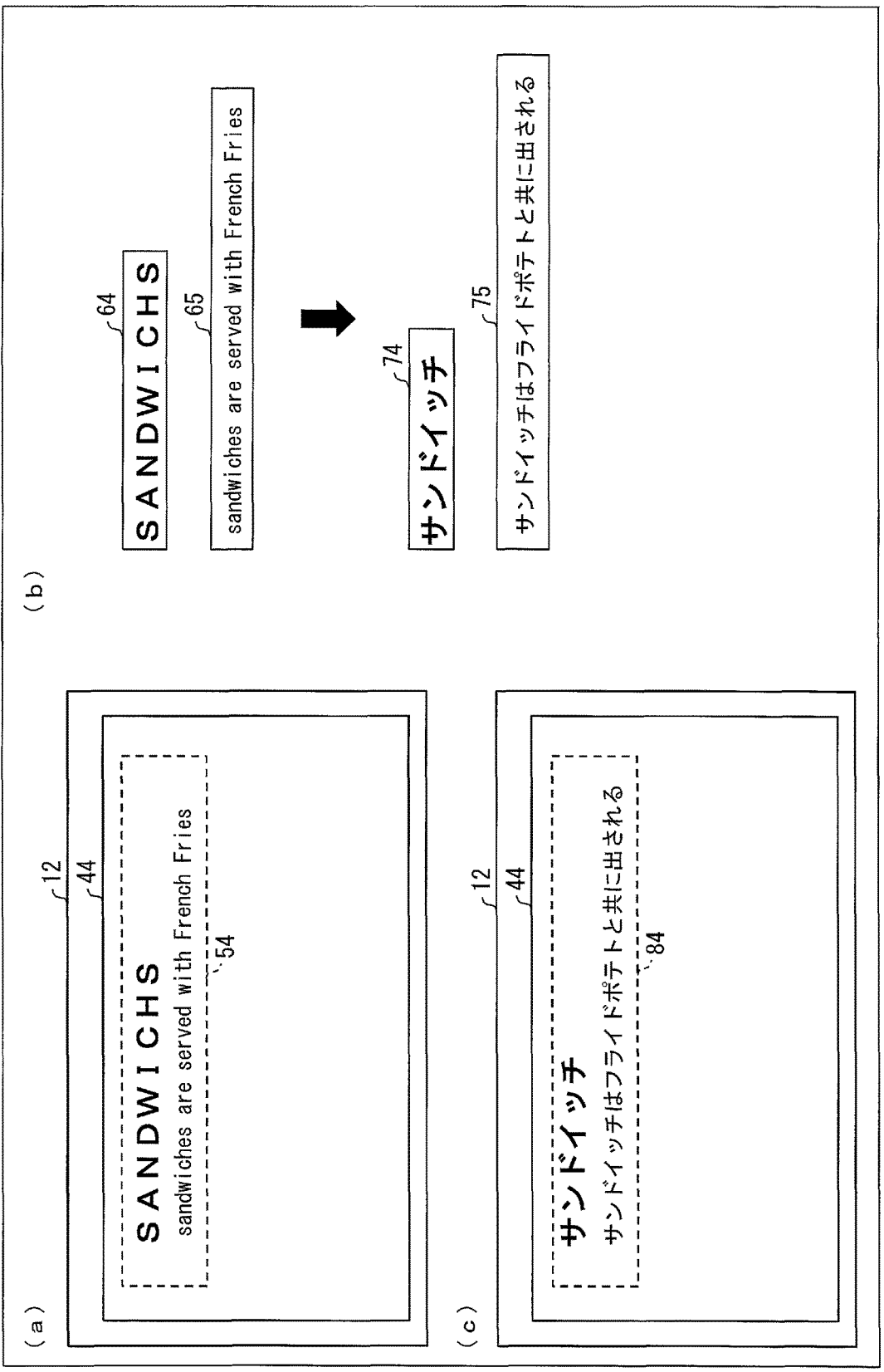
FIG. 4 schematically illustrates an example of a separation condition used in translation of a character string.
Figure 5:
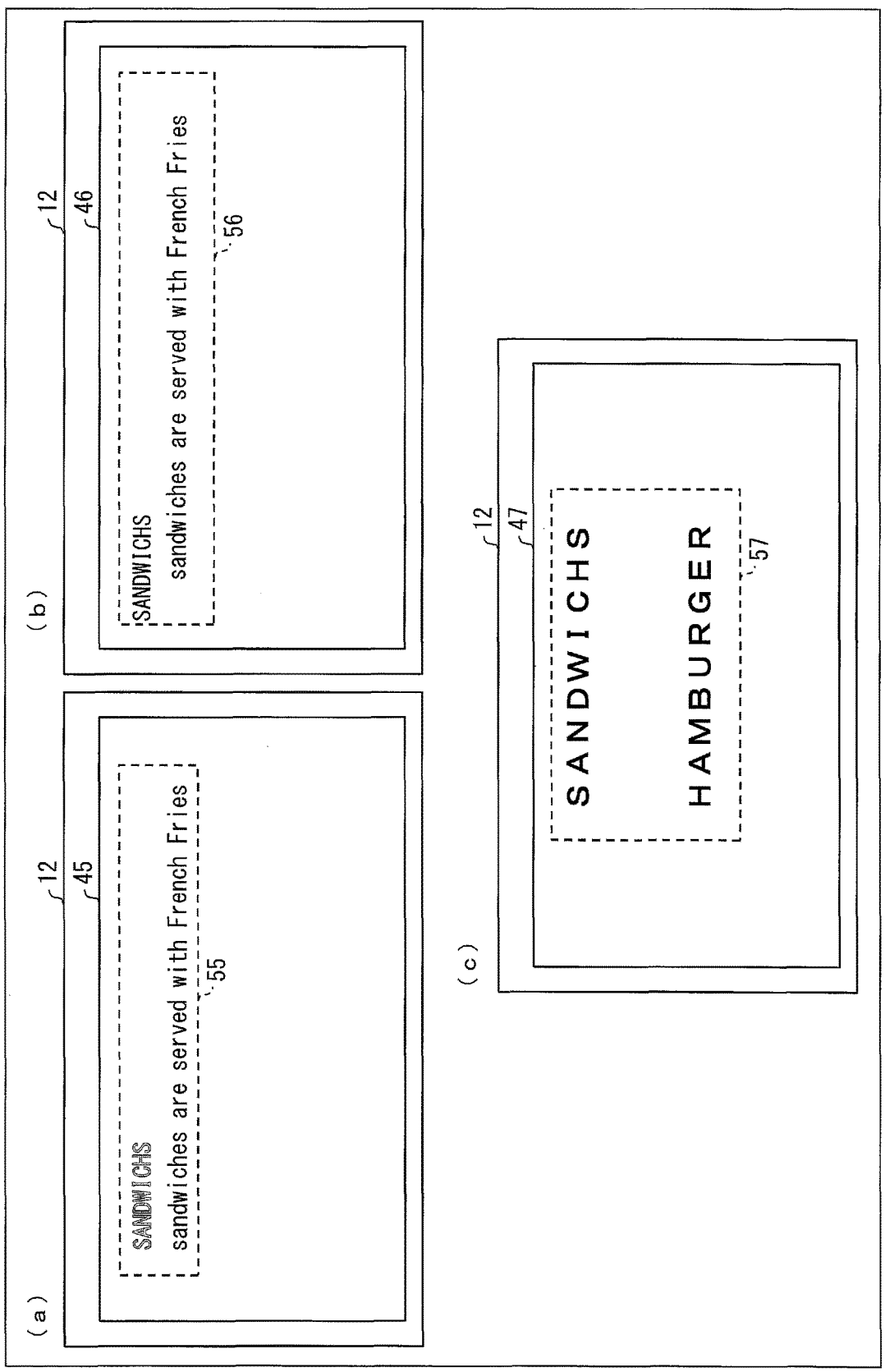
FIG. 5 schematically illustrates other examples of the separation condition used in translation of a character string.

The following description will discuss, with reference to FIGS. 4 and 5, a concrete example of a character string that meets the separation condition. FIG. 4 schematically illustrates an example of the separation condition used in translation of a character string. FIG. 5 schematically illustrates other examples of the separation condition used in translation of a character string. As illustrated in (a) of FIG. 4, an image 44 displayed on a display section 12 includes a character string 54 composed of two lines. The character string 54 is extracted as extracted lines 64 and 65 by a character string extracting section 23 (see (b) of FIG. 4). The condition determining section 24 first determines whether or not the extracted lines 64 and 65 meet the joining conditions (1) through (3). In the example illustrated in FIG. 4, the extracted line 65, which is a latter line of the extracted lines 64 and 65 (two consecutive lines), has a lower-case character as an initial character. The extracted lines 64 and 65 therefore meet the joining condition (1).

In such a case, the condition determining section 24 further determines whether or not the extracted lines 64 and 65 meet the separation conditions (4) through (7). In the example illustrated in FIG. 4, the extracted lines 64 and 65 greatly differ from each other in character size. In a case where a difference in character size between the extracted lines 64 and 65 is not less than a predetermined threshold, the extracted lines 64 and 65 meet the separation condition (4). The extracted line joining section 25 then does not join the extracted lines 64 and 65. Subsequently, the translation section 26 separately translates the extracted lines 64 and 65. This leads to generation of translation results 74 and 75, which are correct translation results that a user desires to obtain (see (b) of FIG. 4). Lastly, the display section 12 displays the translation results 74 and 75 as a translated character string 84, thereby presenting a correct translation result of the character string 54 to the user.

A character string 55 included in an image 45 illustrated in (a) of FIG. 5 includes a latter line whose initial character is a lower-case character. The character string 55 therefore meets the joining condition (1). However, a former line and the latter line of the character string 55 differ from each other in color of characters. The character string 55 therefore further meets the separation condition (6). Next, a character string 56 included in an image 46 illustrated in (b) of FIG. 5 includes a latter line whose initial character is a lower-case character. The character string 56 therefore meets the joining condition (1). However, a former line and the latter line of the character string 56 greatly differ from each other in start position. In other words, in a case where one-dimensional coordinate is set in a line direction of the character string 56, a coordinate of an initial character of the former line greatly differ from a coordinate of the initial character of the latter line. In a case where positions (coordinates) of the initial characters of the former line and the latter line are different from each other by not less than a predetermined value, the character string 56 meets the separation condition (7). In addition, a character string 57 included in an image 47 illustrated in (c) of FIG. 5 includes a latter line composed only of upper-case characters. The character string 57 therefore meets the joining condition (3). However, a former line and the latter line of the character string 57 are at a large distance from each other. In a case where the distance between the former line and the latter line is not less than a predetermined value, the character string 57 meets the separation condition (5). As such, though the former line and the latter line of each of the character strings 55, 56, and 57 meet the joining condition, these lines will be separately translated. This allows presentation of a correct translation result of each character string to a user.

The following description will discuss, with reference to FIG. 7, a flow of a process performed by a smartphone 1. Note that the following will omit detailed descriptions of the steps performed in the process described in Embodiment 1.

According to the smartphone 1 of Embodiment 2, in a case where the joining condition is met (YES in S4), the condition determining section 24 further determines whether or not the two consecutive lines meet the separation condition (S5). In a case where the separation condition is not met (NO in S5), the condition determining section 24 supplies the two consecutive lines to the extracted line joining section 25. The extracted line joining section 25 then joins the two consecutive lines in the image (S6). Specifically, the extracted line joining section 25 joins the two consecutive lines which are supplied from the condition determination section 24 and which meet the joining condition but do not meet the separation condition, thereby generating an extracted-and-joined line. In contrast, in a case where the joining condition is not met (NO in S4), the condition determination section 24 does not supply the two consecutive lines to the extracted line joining section 25, skipping the steps S5 and S6. In a case where the separation condition is met (YES in S5), the condition determining section 24 does not supply the two consecutive lines to the extracted line joining section 25, skipping the step S6.

Embodiment 3

Figure 6:
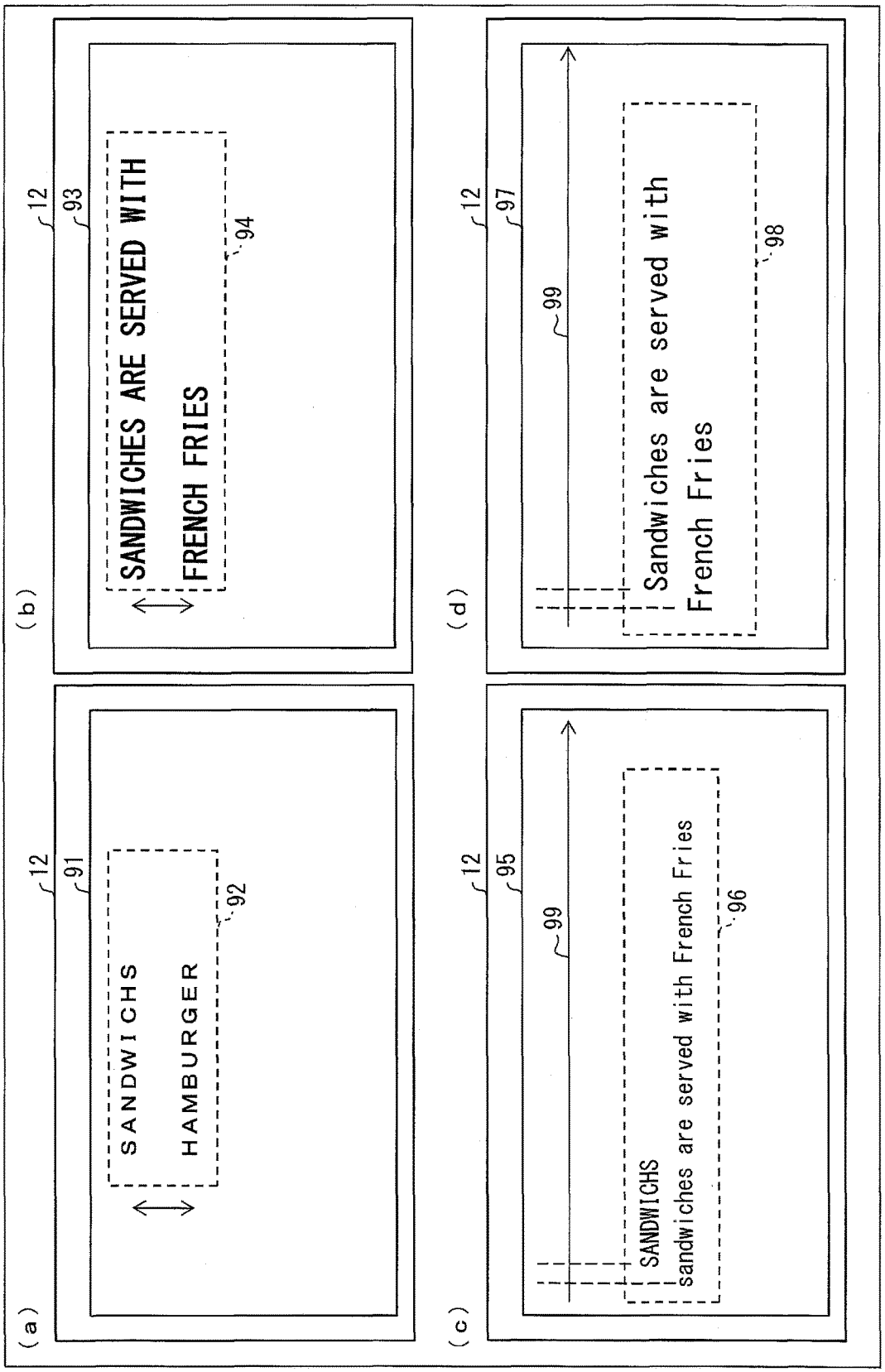
FIG. 6 schematically illustrates how a predetermined value of the separation condition is determined.

The following description will discuss Embodiment 3 of the present invention with reference to FIG. 6. Embodiment 3 is configured such that each predetermined value of the separation conditions described in Embodiment 2 is determined in accordance with character size. That is, a condition determining section 24 of Embodiment 3 determines each predetermined value of the separation conditions (5) and (7) in accordance with an identified character size. An increase in character size of a line included in a character string typically increases a distance between two consecutive lines and a difference between positions of respective initial characters of the two consecutive lines. That is, in a case where each value for determination on the distance and the difference is constant and does not depend on character size, two consecutive lines that should be essentially determined not to meet the separation condition may be erroneously determined to meet the separation condition when the character size is larger. It is possible to reduce the possibility of such erroneous determination, by changing the predetermined value in accordance with character size.

FIG. 6 schematically illustrates how each predetermined value of the separation conditions is determined. An image 91 illustrated in (a) of FIG. 6 includes a character string 92, while an image 93 illustrated in (b) of FIG. 6 includes a character string 94. Each of the character strings 92 and 94 meets the joining condition (3). A comparison between the images 91 and 93 shows that the character string 92 is smaller in character size than the character string 94. The condition determining section 24 accordingly sets a predetermined value of the separation condition (5) for the image 91 smaller than another predetermined value of the separation condition (5) for the image 93. As a result, though a distance between former and latter lines of the character string 92 is identical to a distance between former and latter lines of the character string 94 (i.e., though arrows illustrated in (a) and (b) of FIG. 6 are identical in length), the former and latter lines of the character string 92 meet the separation condition (5) and are therefore separately translated, whereas the former and latter lines of the character string 94 do not meet the separation condition (5) and are therefore joined and then translated.

An image 95 illustrated in (c) of FIG. 6 includes a character string 96 that meets the joining condition (1), whereas an image 97 illustrated in (d) of FIG. 6 includes a character string 98 that meets the joining condition (2). A comparison between the images 95 and 97 shows that the character string 96 is smaller in character size than the character string 98. The condition determining section 24 accordingly sets a predetermined value of the separation condition (7) for the image 95 smaller than another predetermined value of the separation condition (7) for the image 97. As a result, positions of respective initial characters of former and latter lines of the character string 96 are identical in terms of a set coordinate 99 to positions of respective initial characters of former and latter lines of the character string 98, respectively (i.e., a distance between dotted lines illustrated in (c) of FIG. 6 are identical to a distance between dotted lines illustrated in (d) of FIG. 6). In such a case, since each predetermined value is set as above, the former and latter lines of the character string 96 meet the separation condition (7) and are therefore separately translated, whereas the former and latter lines of the character string 98 do not meet the separation condition (7) and are therefore joined and then translated.

As described above, values for determination on a distance between two consecutive lines and on positions of respective initial characters of the two consecutive lines are set in accordance with character size. This makes it possible to reduce the possibility of erroneous determination.

[Software Implementation Example]

Control blocks of the smartphone 1 (particularly, the operation identifying section 21, the image obtaining section 22, the character string extracting section 23, the condition determining section 24, the extracted line joining section 25, the translation section 26, and the display control section 27) can be realized by a logic circuit (hardware) provided in an integrated circuit (IC chip) or the like or can be alternatively realized by software as executed by a central processing unit (CPU).

In the latter case, the smartphone 1 includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Main Points]

A translation device (smartphone 1) of Aspect 1 of the present invention is a translation device that translates a character string included in a captured image, the translation device including: a character string extracting section (character string extracting section 23) for extracting, on a per-line basis, the character string composed of a plurality of lines; a determining section (condition determining section 24) for determining whether or not two consecutive lines in the captured image meet a joining condition that is based on a characteristic of a language of the character string, the two consecutive lines being included in lines extracted by the character string extracting section; and a translating section (extracted line joining section 25 and translation section 26), in a case where the determining section determines that the joining condition is met, the translating section joining and then translating the two consecutive lines, and in a case where the determining section determines that the joining condition is not met, the translation section translating the two consecutive lines, separately.

According to the above configuration, in a case where the two consecutive lines meet the joining condition, they are joined and then translated. In contrast, in a case where the two consecutive lines do not meet the joining condition, they are translated separately. This makes it possible to prevent a plurality of lines that should be essentially translated as a single sentence from being translated as different sentences, in a case where the joining condition is based on a characteristic of a language of a character string and indicates that a line break between two consecutive lines is likely to be put in the middle of a sentence. Further, in a case where the joining condition is based on a characteristic of a language of a character string and indicates that a line break between two consecutive lines is likely to be put in the middle of a sentence, a plurality of lines that should be translated essentially as a single sentence can be correctly translated as a single sentence even if the character string has no mark, such as a punctuation, that separates sentences. This makes it possible to provide a translation device that can accurately translate a character string composed of a plurality of lines.

In Aspect 2 of the present invention, a translation device is arranged such that, in Aspect 1 of the present invention, the language of the character string is English; the joining condition includes: a first condition that a latter line of the two consecutive lines has a lower-case character as an initial character; a second condition that a former line of the two consecutive lines has a last word whose word class is a conjunction, a preposition, or an article; and a third condition that the latter line of the two consecutive lines is composed only of upper-case characters; and the determining section determines whether or not at least any one of the first to third conditions of the joining condition is met.

According to the above configuration, in a case where the character string is written in English, whether or not the two consecutive lines meet the joining condition is determined. Specifically, in a case where a latter line in the order of extraction of the two consecutive lines has a lower-case character as an initial character, a sentence starting from a former line in the order of extraction of the two consecutive lines is possibly continuing in the latter line, and therefore it is determined that the former line and the latter line should be joined. In a case where the former line has a last word whose word class is a conjunction, a preposition, or an article, the sentence starting from the former line is possibly continuing in the latter line, and therefore it is determined that the former line and the latter line should be joined. Even in a case where the latter line has an upper-case character as the initial character, the sentence starting from the former line is possibly continuing in the latter line if the latter line is composed only of upper-case characters. In this case, it is therefore determined that the former line and the latter line should be joined. This allows a character string written in English to be translated on a per-sentence basis, achieving accurate translation of a character string composed of a plurality of lines written in English.

In Aspect 3 of the present invention, a translation device is arranged such that, in Aspect 1 or 2 of the present invention, the determining section further determines whether or not a separation condition is met, the separation condition being based on at least either characteristics of characters constituting the two consecutive lines or a positional relationship between the two consecutive lines; and in a case where the separation condition and the joining condition are met, the translating section translates the two consecutive lines, separately.

According to the above configuration, even in a case where two consecutive lines meet the joining condition, the two consecutive lines will not be joined to each other if the two consecutive lines that meet the separation condition, which is based on the characteristics of the characters constituting the two consecutive lines or the positional relationship between the two consecutive lines. That is, in a case where the characteristics of the characters or the positional relationship (separation condition) indicates that the two consecutive lines are likely to have different sentences, respectively, the two consecutive lines that are likely to have different sentences, respectively, can be correctly translated as different sentences even if they meet the joining condition. This allows more accurate translation of a character string composed of a plurality of lines.

In Aspect 4 of the present invention, a translation device is arranged such that, in Aspect 3 of the present invention, the separation condition includes a fourth condition that a difference in character size between the two consecutive lines exceeds a predetermined character size threshold; a fifth condition that a distance between the two consecutive lines exceeds a predetermined distance threshold; a sixth condition that the two consecutive lines differ from each other in color of characters; and a seventh condition that positions of respective initial characters of the former line and the latter line of the two consecutive lines are different from each other in a line direction of the character string, by more than a predetermined character position threshold; and the determining section determines whether or not at least any one of the fourth to seventh conditions of the separation condition is met.

According to the above configuration, in a case where the two consecutive lines greatly differ from each other in character size, the two consecutive lines are likely to have different sentences, respectively. Similarly, in a case where the two consecutive lines are at a distance from each other which distance is not less than a predetermined distance, the two consecutive lines are likely to have different sentences, respectively. Similarly, in a case where the two consecutive lines differ from each other in color of characters, the two consecutive lines are likely to have different sentences, respectively. Similarly, in a case where positions of respective initial characters of the two consecutive lines are different from each other by not less than a predetermined value, the two consecutive lines are likely to have different sentences, respectively. As such, a character string composed of a plurality of lines can be more accurately translated by leaving two consecutive lines unjoined in a case where the two consecutive lines meet the above condition, i.e., the condition indicating that the two consecutive lines are likely to have different sentences, respectively.

In Aspect 5 of the present invention, a translation device is arranged to further include, in Aspect 4 of the present invention, a character size determining section (condition determination section 24) for determining character sizes of lines extracted by the character string extracting section, the determining section determining the predetermined distance threshold and the predetermined character position threshold in accordance with the character sizes determined by the character size determining section.

According to the above configuration, each value for determination on a distance between the two consecutive lines and on a difference between positions of respective initial characters of the two consecutive lines is determined based on character sizes of the lines extracted. An increase in character size of a line included in a character string typically increases a distance between two consecutive lines and a difference between positions of respective initial characters of two consecutive lines. That is, in a case where each value for determination on the distance and on the difference is constant regardless of character size, two consecutive lines that should be essentially determined not to meet the separation condition may be erroneously determined to meet the separation condition when the character size is larger. It is possible to reduce the possibility of such erroneous determination, by setting each value for determination on a distance between two consecutive lines and on a difference between positions of respective initial characters of the two consecutive lines, in accordance with character size.

The translation device of the foregoing embodiments of the present invention can be realized by a computer. In such a case, the scope of the present invention encompasses: a control program for the translation device which program causes a computer to operate as the foregoing sections of the translation device so that the translation device can be realized by the computer; and a computer-readable storage medium storing the program.

The present invention is not limited to the embodiments above, but can be altered by a skilled person in the art within the scope of the claims. An embodiment based on a proper combination of technical means disclosed in different embodiments is encompassed in the technical scope of the present invention. Furthermore, the technical means disclosed in different embodiments can be combined to form a novel technical feature.

INDUSTRIAL APPLICABILITY

The present invention is applicable to a translation device that translates a character string included in a captured image, and is particularly suitable for a smartphone, a tablet terminal, a digital camera, and the like.

REFERENCE SIGNS LIST

1 Smartphone (translation device)
23 Character string extracting section
24 Condition determining section (determining section, character size determining section)
25 Extracted line joining section (translating section)
26 Translation section (translating section)

The invention claimed is:

1. A translation device that translates a character string included in a captured image,
   the translation device comprising:
   at least one processor; and
   at least one memory in electronic communication with the at least one processor;
   instructions stored in the at least one memory, the instructions being executable to:
     extract, on a per-line basis, the character string composed of a plurality of lines;
     determine whether or not two consecutive lines in the captured image meet a joining condition that is based on a characteristic of a language of the character string, the two consecutive lines being included in the plurality of extracted lines;
     join and then translate the two consecutive lines, in a case where it is determined that the joining condition is met, and
     translate the two consecutive lines, separately, in a case where it is determined that the joining condition is not met,
   the language of the character string is English;
   the joining condition includes:
     a first condition that a latter line of the two consecutive lines has a lower-case character as an initial character;
     a second condition that a former line of the two consecutive lines has a last word whose word class is a conjunction, a preposition, or an article; and
     a third condition that the latter line of the two consecutive lines is composed only of upper-case characters; and
   the instructions are executable to determine whether or not at least any one of the first to third conditions of the joining condition is met.

2. A translation device that translates a character string included in a captured image,
   the translation device comprising:
   at least one processor; and
   at least one memory in electronic communication with the at least one processor;
   instructions stored in the at least one memory, the instructions being executable to:
     extract, on a per-line basis, the character string composed of a plurality of lines;
     determine whether or not two consecutive lines in the captured image meet a joining condition that is based on a characteristic of a language of the character string, the two consecutive lines being included in the plurality of extracted lines;
     join and then translate the two consecutive lines, in a case where it is determined that the joining condition is met;

translate the two consecutive lines, separately, in a case where it is determined that the joining condition is not met;

determine whether or not a separation condition is met, the separation condition being based on at least either characteristics of characters constituting the two consecutive lines or a positional relationship between the two consecutive lines; and translate the two consecutive lines, separately, in a case where the separation condition and the joining condition are met.

3. The translation device according to claim 2, wherein: the separation condition includes:

a fourth condition that a difference in character size between the two consecutive lines exceeds a predetermined character size threshold;

a fifth condition that a distance between the two consecutive lines exceeds a predetermined distance threshold;

a sixth condition that the two consecutive lines differ from each other in color of characters; and a seventh condition that positions of respective initial characters of the former line and the latter line of the two consecutive lines are different from each other in a line direction of the character string, by more than a predetermined character position threshold; and the instructions are executable to determine whether or not at least any one of the fourth to seventh conditions of the separation condition is met.

4. The translation device according to claim 3, wherein the instructions are executable to:

determine character sizes of the plurality of extracted lines; and determine the predetermined distance threshold and the predetermined character position threshold in accordance with the determined character sizes.

* * * * *